United States Patent
Hasegawa et al.

(10) Patent No.: US 7,333,265 B2
(45) Date of Patent: Feb. 19, 2008

(54) MICROSCOPE APPARATUS

(75) Inventors: Kazuhiro Hasegawa, Tokyo (JP);
Atsuhiro Tsuchiya, Tokyo (JP);
Akitsugu Kagayama, Tokyo (JP);
Takashi Yoneyama, Tokyo (JP);
Katsuyoshi Yamaguchi, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/409,695

(22) Filed: Apr. 24, 2006

(65) Prior Publication Data

US 2006/0238885 A1 Oct. 26, 2006

(30) Foreign Application Priority Data

Apr. 26, 2005 (JP) ............................. 2005-128268

(51) Int. Cl.
*G02B 21/00* (2006.01)
(52) U.S. Cl. .................. 359/368; 359/656; 359/665
(58) Field of Classification Search ........ 359/368–378, 359/656, 665
See application file for complete search history.

(56) References Cited

U.S. PATENT DOCUMENTS 6,980,293 B1 * 12/2005 Harada ...................... 356/317

2004/0263961 A1 12/2004 Hummel

FOREIGN PATENT DOCUMENTS

| JP | 2004-070307 | 3/2004 |
| JP | 2004-531765 A | 10/2004 |
| WO | WO 02/093232 A2 | 11/2002 |

* cited by examiner

*Primary Examiner*—Scott J. Sugarman
*Assistant Examiner*—Darryl J. Collins
(74) *Attorney, Agent, or Firm*—Frishauf, Holtz, Goodman & Chick, P.C.

(57) ABSTRACT

Provided is a microscope having an immersion objective lens, a nozzle, and a liquid supplying mechanism. The immersion objective lens condenses light from a sample through liquid. The nozzle supplies the liquid to an upper surface of the immersion objective lens. The liquid supplying mechanism cooperates with one of a lens moving mechanism that moves the immersion objective lens and a sample moving mechanism that maintains and moves the sample, and moves the nozzle relative to the immersion objective lens to supply the liquid.

9 Claims, 7 Drawing Sheets

MICROSCOPE APPARATUS

CROSS-REFERENCE TO RELATED APPLICATIONS

This application is based upon and claims the benefit of priority from Japanese Patent Application No. 2005-128268, filed Apr. 26, 2005, the entire contents of which are incorporated herein by reference.

BACKGROUND OF THE INVENTION

1. Field of the Invention

The present invention relates to a microscope apparatus provided with an immersion objective lens.

2. Description of the Related Art

Function analysis of genes is widely conducted through experiments on cultured cells; one of such experiments is performed by time-lapse observation in which cultured cells are intermittently photographed for a prolonged time period. The cultured cells, i.e., living cells are generally damaged by photostimulation. Hence, to minimize the damages to the living cells, an objective lens with a high numerical aperture (NA) is employed in the observation of the cultured cell because such a lens can capture more fluorescence with a smaller amount of exciting light.

Suitable objective lenses with a high NA for such observation are immersion objective lenses, which are employed together with high-refractive index liquid which fills up a space between the immersion objective lens and a sample to be observed. Japanese translation of PCT international application No. 2004-531765 proposes a liquid feeder which supplies liquid to the immersion objective lens. The proposed liquid feeder supplies liquid to the immersion objective lens through an outlet of a feeding unit arranged near a side of an exit lens of the immersion objective lens. Since the outlet of the feeding unit is located close to the exit lens of the immersion objective lens, a simply-structured liquid feeder can supply the liquid without the need of a moving mechanism for the feeding unit.

The above-described arrangement, however, in which the outlet of the feeding unit is located near the side of the exit lens, is disadvantageous in that a large amount of liquid is required for filling up a gap between the exit lens and the sample. The immersion objective lenses can be classified into two groups depending on the types of employed liquid; namely, the water immersion objective lenses that employ water and oil immersion objective lenses that employ oil. On the one hand, the use of the oil immersion tends to accompany increase in experiment cost, since the oil employed for the oil immersion is expensive, and a larger amount of oil needs to be supplied than is required simply for observation. On the other hand, the use of the water immersion also accompanies increase in experiment cost, since a container with a large capacity is required for storage of a larger amount of liquid than is necessary, and a high-performance pump needs to be provided for reduction of time required for the liquid feed.

A necessary amount of supplied liquid can be minimized with the use of a nozzle and a pump that are generally used for supply of determinate quantity of liquid. For the minimization of the amount of supplied liquid, however, the liquid must be fed from substantially directly above a targeted portion, i.e., the immersion objective lens. At a time of the observation, the nozzle has to be removed from a moving range of the immersion objective lens, and hence an additional mechanism for nozzle retraction and a driving unit for the mechanism are necessary, which implies a further increase in equipment cost.

SUMMARY OF THE INVENTION

A microscope apparatus according to one aspect of the present invention includes an immersion objective lens that condenses light from a sample through a liquid; a nozzle that supplies the liquid to an upper surface of the immersion objective lens; and a liquid feeding mechanism that cooperates with one of a lens moving mechanism that moves the immersion objective lens and a sample moving mechanism that holds and moves the sample, and moves the nozzle relative to the immersion objective lens to supply the liquid.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be described in detail below with reference to the accompanying drawings.

Figure 1:
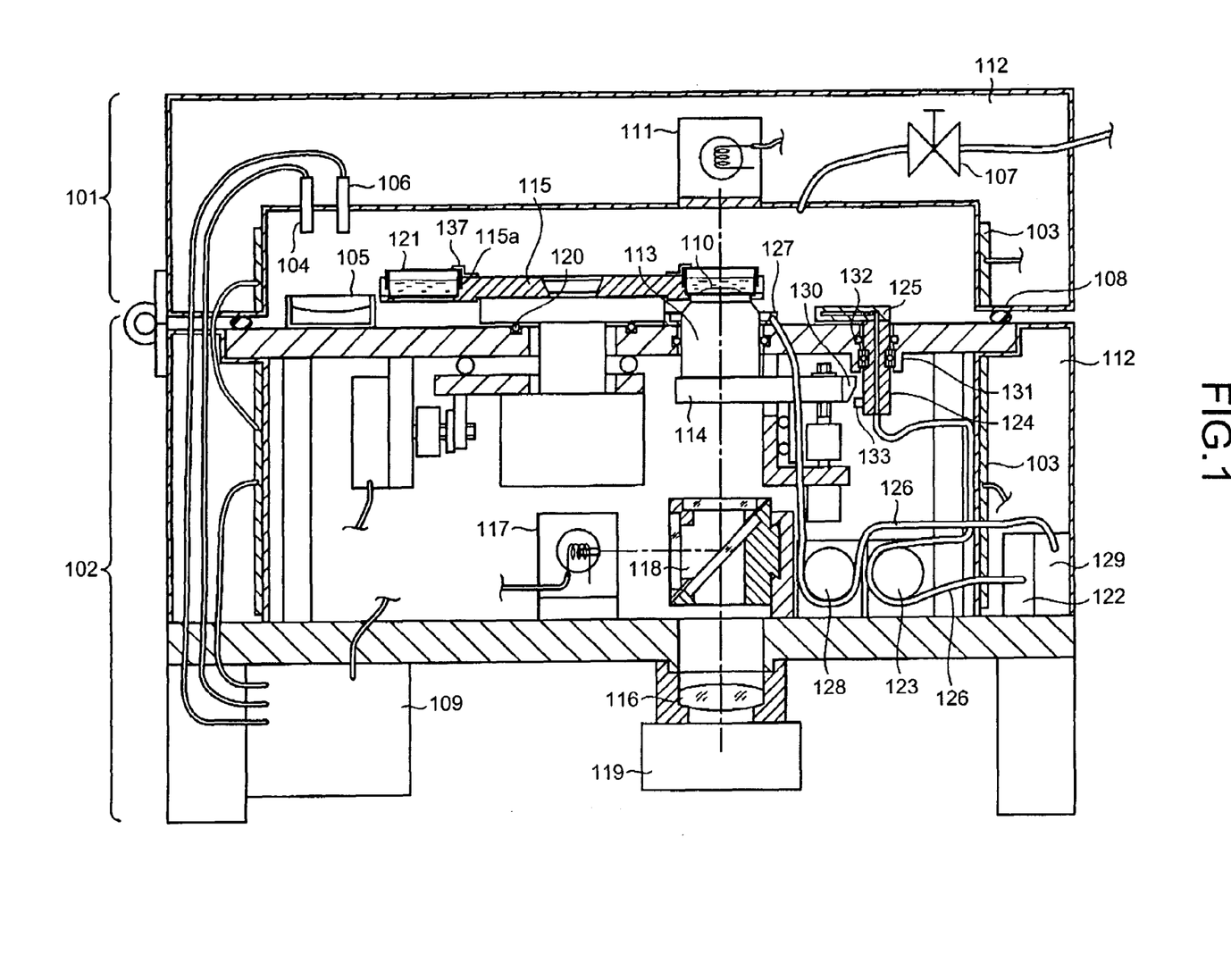
FIG. 1 is a schematic diagram of a microscope apparatus according to a first embodiment of the present invention.

A microscope apparatus according to a first embodiment of the present invention is shown in FIG. 1. The microscope apparatus of FIG. 1 includes a culture section 101 for maintenance of a proper environment, and a microscope section 102 for observation. The culture section 101 and the microscope section 102 each have a heat insulating layer 112 which blocks heat transfer to/from outside, and a heater 103 arranged in contact with an inner wall of the heat insulating layer 112, so that temperature of each of the culture section 101 and the microscope section 102 can be maintained at a constant level. At a portion where the culture section 101 and the microscope section 102 are joined, an elastic sealing member 108 is provided to secure air-tightness of the culture section 101.

The culture section 101 further includes a temperature sensor 104, a moisturizing pad 105, a $CO_2$ sensor 106, and an electromagnetic valve 107. The microscope section 102 has a controller 109 which controls the heater 103 according to signals supplied from the temperature sensor 104, the electromagnetic valve 107 according to signals supplied from the $CO_2$ sensor 106, thereby maintaining the culture section 101 in which a cultured cell 110 is placed generally at a temperature of 37° C., a $CO_2$ concentration of 5%, and a relative humidity of at least 95% so as to maintain an activity of the cultured cell 110. Further, the culture section 101 includes a transmitted light source 111 which is arranged on a top surface thereof to allow for an observation with transmitted light.

The microscope section 102 further includes an immersion objective lens 113, a focusing unit 114 which moves the immersion objective lens 113 up and down in a vertical direction, a stage 115 on which a sample container 121 housing the cultured cell 110 is placed, an imaging lens 116 which focuses parallel light rays on the immersion objective lens 113, an incident light source 117 which illuminates the sample through the immersion objective lens 113, a fluorescent filter 118, and a charge coupled device (CCD) camera 119. The stage 115 has a linearly moving unit and a rotationally moving unit and is able to two-dimensionally move the sample container 121 in a plane perpendicular to an optical axis of the immersion objective lens 113 relative to the immersion objective lens 113. The transmitted light source 111 attached to the culture section 101 is employed for a morphological observation which aims at capturing an overall image of the cultured cell 110, while the incident light source 117 and the fluorescent filter 118 are employed for fluorescent observation of a specific site of the cultured cell 110 with the use of fluorescent dye, fluorescent protein, or the like.

The stage 115 protrudes from the microscope section 102 toward the culture section 101 with an elastic sealing member 120 placed between a bottom surface of the culture section 101 and the stage 115 so that humidity inside the culture section 101 does not leak out to the microscope section 102. A function of the sealing member 120 can alternatively be realized by a gap between the stage 115 and the bottom surface of the culture section 101 when the gap is set to approximately submillimeter. The controller 109 is also connected to and controls the transmitted light source 111, the focusing unit 114, the stage 115, the incident light source 117, and the CCD camera 119.

The space between the immersion objective lens 113 and the sample container 121 is filled with liquid such as water or oil. Since the liquid is not supported by a specific holding unit, the liquid may adhere to the sample containers 121 when plural sample containers 121 are used for observation, or may expand due to change in observation position in the sample container 121 even when the single sample container 121 is employed for observation. In such cases, the amount of liquid may become insufficient and the refill of the liquid may become necessary.

The liquid feeder is largely divided into a mechanical unit and a liquid delivery unit. The liquid delivery unit has a liquid feeding unit and a liquid discharging unit. The liquid feeding unit includes a feeding tank 122 which stores the liquid, a feeding pump 123 which delivers the liquid, a rotating arm 124 which rotates around an axis parallel to the optical axis of the immersion objective lens 113, and a nozzle 125 which is fixed to the rotating arm 124. The nozzle 125 and the rotating arm 124 are penetrated by a thin hole inside, and the rotating arm 124, the feeding pump 123, and the feeding tank 122 are connected with each other by a tube 126 made of silicon or the like. The liquid discharging unit includes a waste liquid saucer 127 in which the liquid drops off from the immersion objective lens 113 is stored, a discharge pump 128 which serves to discharge a fixed amount of stored liquid, and a discharge tank 129 which stores the liquid. The waste liquid saucer 127, the discharge pump 128, and the discharge tank 129 are connected with each other by a tube 126 similar to the tube in the liquid feeding unit. The tube 126 extends from the feeding pump 123 to the rotating arm 124 along the inner wall of the microscope 102.

Figure 2:
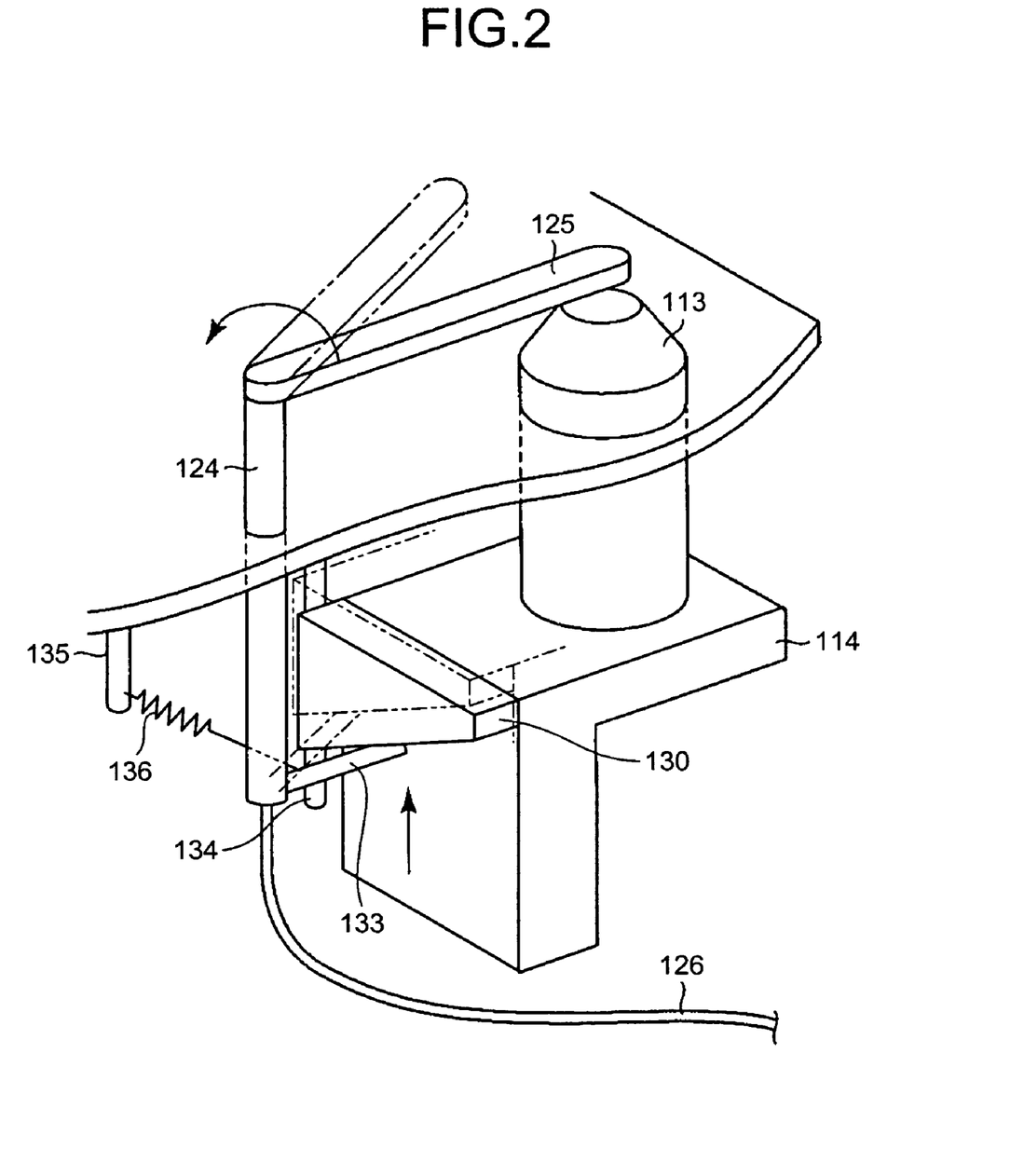
FIG. 2 is a detailed diagram of a mechanical unit of a liquid feeder in the microscope apparatus shown in FIG. 1.

FIG. 2 is a detailed diagram of the mechanical unit of the liquid feeder. A solid line in FIG. 2 shows a liquid feeding state where the immersion objective lens 113 is in a lower position, and a two-dot chain line in FIG. 2 shows an observation state in which the immersion objective lens 113 is in an upper position. The mechanical unit includes a cam member 130 provided in the focusing unit 114, and the rotating arm 124 arranged at an upper portion of the microscope section 102. The cam member 130 has a cam surface inclined toward a vertical moving direction of the immersion objective lens 113. The cam member 130 triggers an operation to drive the rotating arm 124. The rotating arm 124 is rotatably supported by a bearing 131 on an inner side surface of the upper surface of the microscope section 102, and protrudes toward the culture section 101 from the microscope section 102. The nozzle 125 is fixed to the rotating arm 124 so that the nozzle 125 is arranged perpendicular to the rotating axis of the rotating arm 124.

As shown in FIG. 1, an elastic sealing member 132 is placed between the rotating arm 124 and the microscope section 102. In FIG. 2, the rotating arm 124 is provided with a rotating pin 133 which contacts with the cam member 130 within the moving range of the focusing unit 114. The rotating pin 133 is arranged perpendicular to the rotation axis of the rotating arm 124. On an inner side of the microscope section 102, a restricting pin 134 is attached. The restricting pin 134 contacts with the rotating pin 133 and restricts the rotation of the rotating arm 124. To bring the rotating pin 133 into contact with the restricting pin 134, a hook 135 attached inside the upper portion of the microscope section 102 is connected to the rotating pin 133 by an elastic spring member 136.

In FIG. 1, the sample container 121 is fitted into a depressed portion 115a on the stage 115, and fixed by a plate-like elastic metal fixing member 137. When the cultured cell 110 is observed, the immersion objective lens 113 is located at an upper position within the moving range of the focusing unit 114. In the observation state, the rotating arm 124 is brought into contact with the restricting pin 134 due to the force from the spring member 136 connected to the rotating arm 124. In this state, the rotating pin 133 of the rotating arm 124 is not in contact with the cam member 130 attached to the focusing unit 114.

When an observation target changes to the cultured cell 110 contained in the other sample container 121 placed on the stage 115, the immersion objective lens 113 is lowered by a significant degree by the focusing unit 114 so that the stage 115 does not interfere with the immersion objective lens 113. Then, the cam member 130 pushes the rotating pin 133 to cause the rotation of the rotating arm 124 against the tensile force of the spring member 136, whereby the nozzle 125 attached to the rotating arm 124 is placed near and above a top lens of the immersion objective lens 113. Thus, the nozzle 125 moves in conjunction with the movement of the immersion objective lens 113 caused by the focusing unit 114.

Since the objective lens is positioned to an accuracy of submicrometer ($\mu m$), even a small amount of external force can easily cause defocusing and the proper repositioning of the objective lens is difficult. In the present embodiment, however, the focusing unit 114 rotates the rotating arm 124 not to a focus position required for an image pick-up, and hence, the application of external force to the focusing unit 114 would not cause defocusing. In addition, since the temperature of the liquid reaches the same level as the temperature of the microscope section 102 while passing through the tube 126 running along the inner wall of the microscope section 102, in other words, the temperature of the liquid becomes the same as the temperature of the immersion objective lens 113 to which the liquid is delivered, there would be no defocusing caused by the temperature change in the immersion objective lens 113. Still in addition, since the nozzle 125 is placed near and above the top lens of the immersion objective lens 113, the liquid can be supplied through the nozzle 125 by a minimum amount required for the observation. Still in addition, since the rotation of the nozzle 125 can be realized without the need of a dedicated driving unit, the microscope can be manufactured by low cost.

Figure 3:
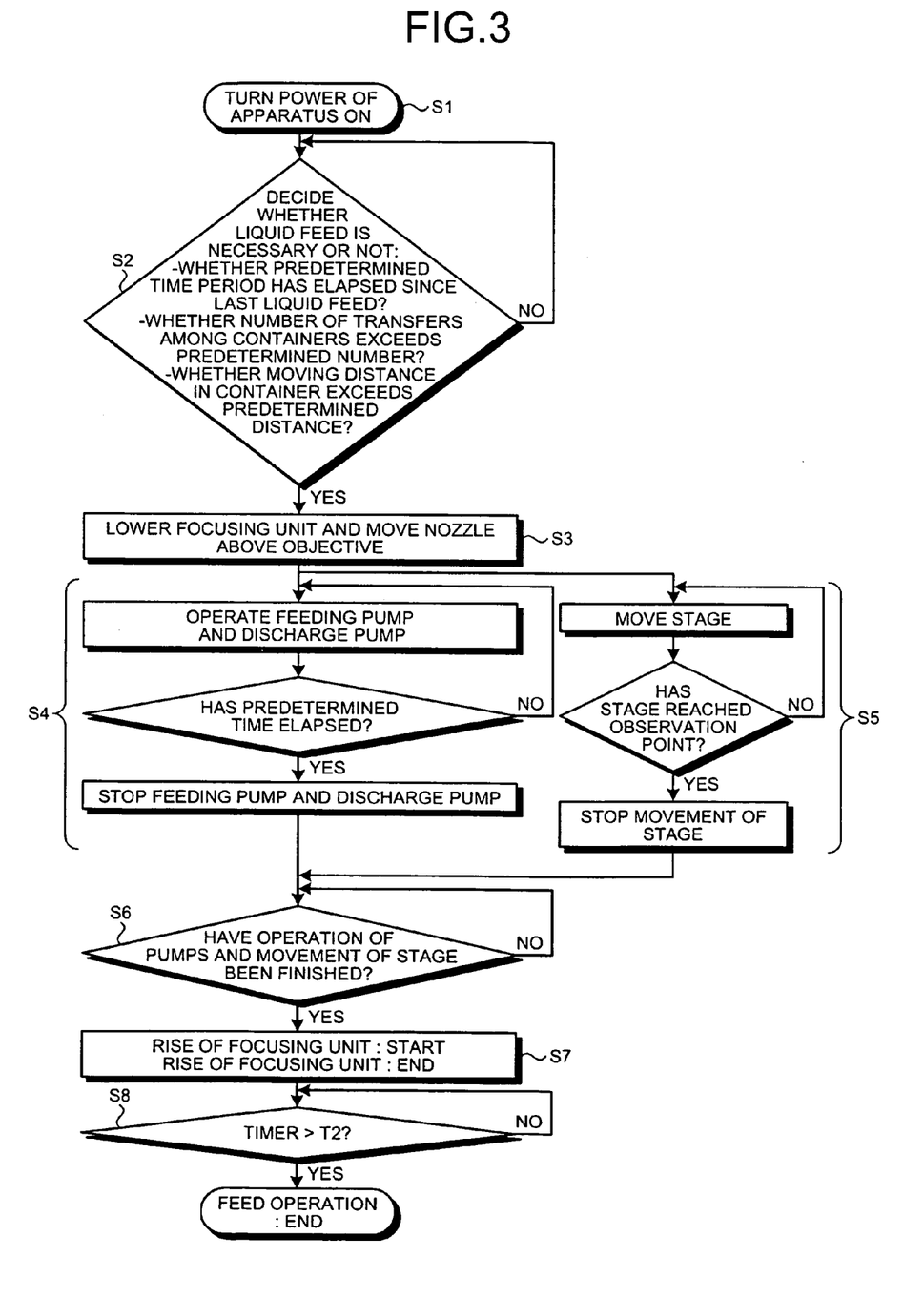
FIG. 3 is a flowchart of a liquid feed process according to the first embodiment of the present invention.

The timing of liquid feed will be described below with reference to the flowchart of FIG. 3.

On power-up of the microscope apparatus, the feeding unit starts control (Step S1).

The necessity of liquid feed to the immersion objective lens 113 is evaluated based on following three Conditions 1 to 3 (Step S2).

Condition 1: The liquid, particularly the water, of the immersion objective lens 113 decreases by evaporation. The necessity of the liquid feed is determined based on the time elapsed since last liquid feed. When the time elapsed since the last liquid feed exceeds a predetermined time period, a liquid feed operation starts. Here, an optimal value is set in advance as a value of the predetermined time period depending on the composition of the liquid, for example, depending on whether the liquid is water or oil.

Condition 2: The liquid of the immersion objective lens 113 adheres to the bottom of the container while transferred from one container to another, and the amount available gradually decreases. The amount of liquid decrease is determined based on the number of transfers among containers. When the number of transfers exceeds a predetermined number, the liquid feed operation starts.

Condition 3: When the point of observation changes in the single container, the container is moved. Then, the liquid of the immersion objective lens 113 adheres to the bottom of the container as if the liquid is applied thereto, and the available amount of liquid decreases. The amount of decreased liquid is determined based on the distance the container moves. When the moving distance exceeds a predetermined distance, the liquid feed operation starts.

In the liquid feed operation, the focusing unit 114 is first lowered so that the nozzle 125 is placed over the immersion objective lens 113 (Step S3).

The feeding pump 123 and the discharge pump 128 are operated for a predetermined time period (Step S4). The operation time of the feeding pump 123 may be set so that a slightly larger amount of liquid is supplied than is necessary in order to prevent supply shortage. For example, if the required amount is 0.2 cc, the operation time is set so that 0.3 cc liquid is supplied.

When the observation point needs to be changed, the stage 115 is moved (Step S5).

It is decided whether the operation of the feeding pump 123 and the discharge pump 128, and the moving operation of the stage 115 have been finished (Step S6).

Then, the focusing unit 114 is moved to a predetermined position (Step S7).

Finally, latency T2 is set by a timer, and after the latency T2 passes, the feed operation ends (Step S8). The latency T2 is set to eliminate a small temperature difference between the liquid and the immersion objective lens 113, and serves to prevent defocusing from being caused by the temperature difference which induces extension of material used in the immersion objective lens 113.

According to the above-described control manner, the liquid feed to the immersion objective lens 113 is performed simultaneously with the two-dimensional movement of the immersion objective lens 113 relative to the optical axis. Hence, the above manner can shorten the time interval between observations compared with a control manner in which steps are conducted sequentially in series. In addition, since the latency T2 is provided in Step S8 prior to the observation, defocusing of the immersion objective lens 113 can be prevented from happening by the temperature change, whereby an image with no blurring can be taken.

In the first embodiment, the microscope apparatus provided with the culture section is described. The liquid feeder of the present embodiment, however, can be applied to a general manual microscope.

Figure 4:
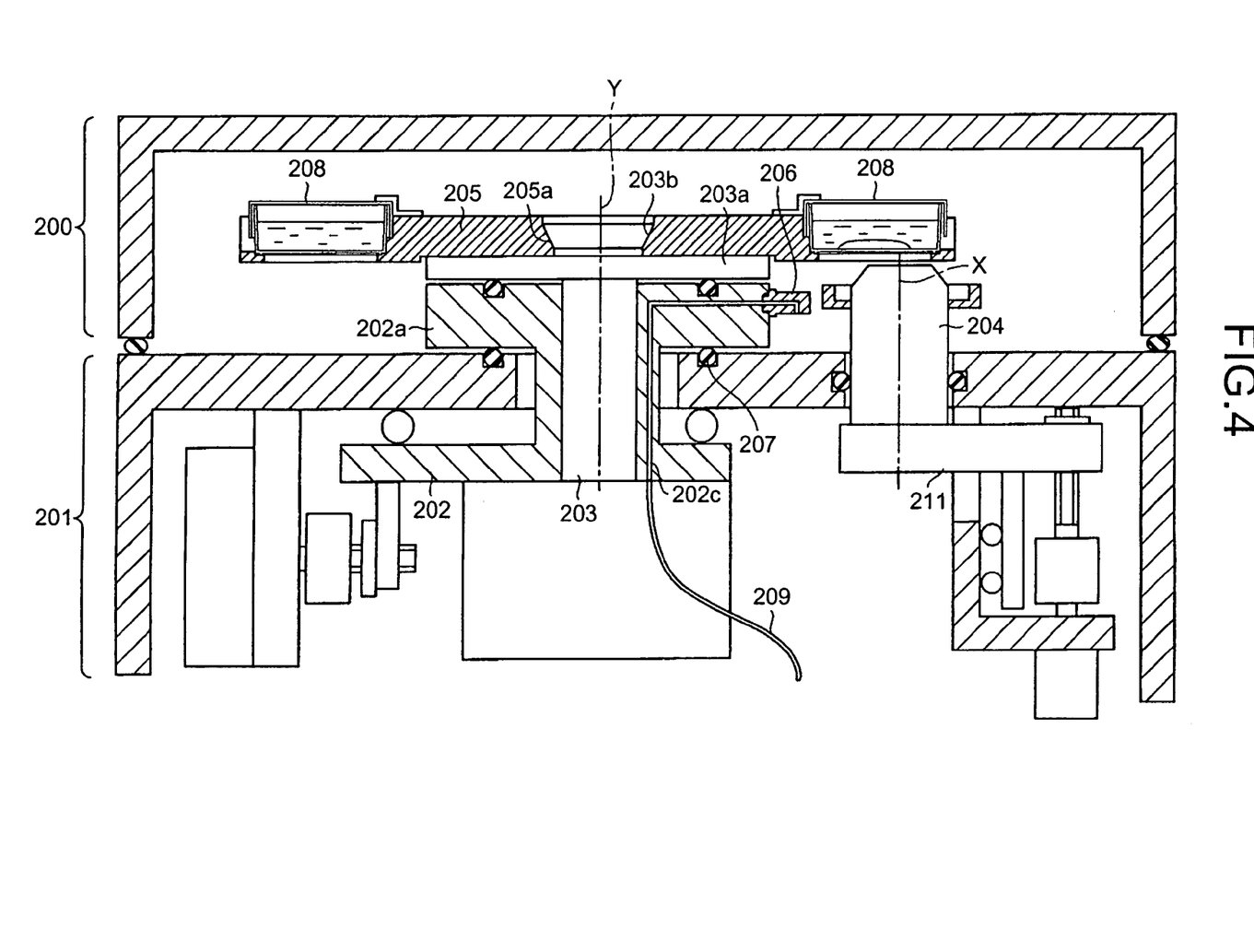
FIG. 4 shows main parts of a microscope apparatus according to a second embodiment of the present invention.

A microscope apparatus according to a second embodiment has a liquid feed-related portion shown in FIG. 4 which is different from the microscope apparatus of the first embodiment. The parts not shown in FIG. 4 are the same as those in the first embodiment. The microscope apparatus according to the second embodiment includes a culture section 200 and a microscope section 201. The microscope section 201 includes a linearly moving stage 202 which is attached to an upper surface thereof and which is movable in one axial direction. The linearly moving stage 202 is further attached to a rotary stage 203 which is rotatable. The linearly moving stage 202 has a sealing portion 202a which protrudes toward the culture section 200 from the microscope section 201. Further, the rotary stage 203 has a tray connecting portion 203a which protrudes toward the culture section 200 from the microscope section 201.

The tray connecting portion 203a has a male dovetail 203b, whereas a tray 205 has a female dovetail 205a which has such a shape that it is engaged with the male dovetail 203b. The sealing portion 202a has a nozzle 206 for feeding the liquid to the immersion objective lens 204. An elastic sealing member 207 is arranged between the sealing portion 202a and the upper surface of the microscope section 201 to prevent the leakage of humidity generated in the culture section 200 to the microscope section 201. The function of the sealing member 207 may alternatively be realized by setting a gap between the sealing portion 202a and the upper surface of the microscope section 201 to approximately submillimeter.

A general glass bottom dish employed as the sample container 208 has an outer diameter of approximately 35 mm and an observation range of approximately 10 mm in diameter. The sample container 208 is placed on the tray 205 on a circle of approximately 70 mm in radius around a rotation axis Y of the rotary stage 203. The moving direction of the linearly moving stage 202 is parallel to a straight line which is perpendicular to the rotation axis Y of the rotary stage 203 and an optical axis X of the immersion objective lens 204. The linear stage 202 and the rotary stage 203 can cooperate to move the sample container 208 placed on the tray 205 two-dimensionally within a plane perpendicular to the optical axis of the immersion objective lens 204. Since the sample container 208 has an observation range of 10 mm in diameter, the moving range of the linear stage 202 is required to be approximately 10 mm for observation. Thus, the observation range of the sample container 208 can be observed by the CCD camera. Since the rotation angle of the rotary stage 203 relative to the imaging range of the CCD camera is sufficiently small, an operator can regard the movements as movements in two perpendicular directions during operation.

The linear stage 202 of the present embodiment has a moving range which is larger than the necessary range 10 mm for observation by 20 mm. The additional moving range of 20 mm is set based on the half length, i.e., 15 mm of the outermost diameter 30 mm of the immersion objective lens 204. With the moving range of 30 mm, the nozzle 206 placed outside the immersion objective lens 204 can be arranged near and above a top lens of the immersion objective lens 204 within the observation range of the sample container 208.

Figure 5:
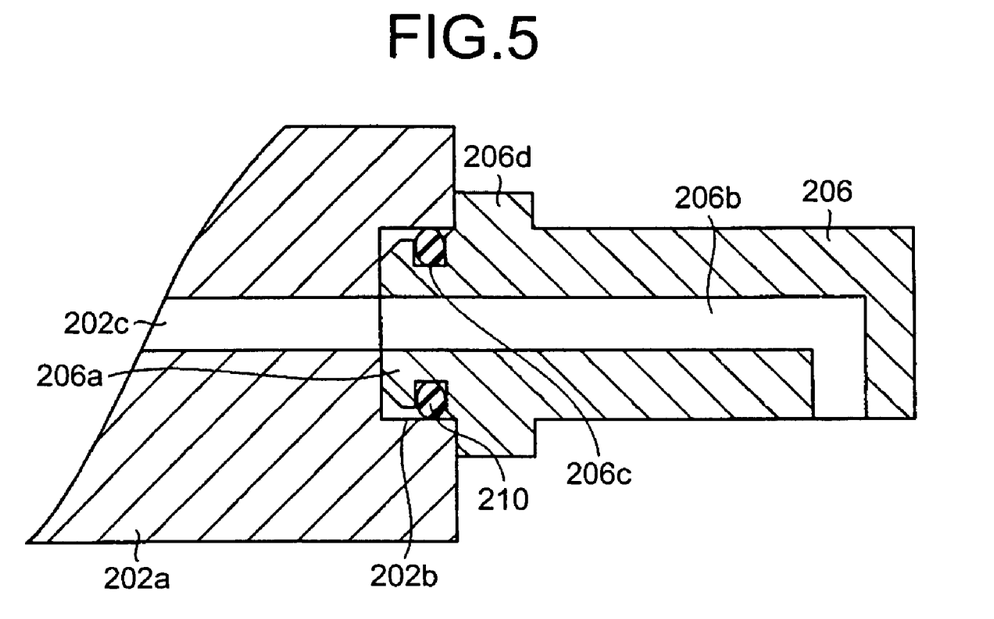
FIG. 5 is an enlarged view of a nozzle shown in FIG. 4 and a surrounding portion thereof.

As shown in FIG. 5, the sealing portion 202a has a depressed portion 202b for the attachment of the nozzle 206. The sealing portion 202a has a depressed portion 202b and a small hole 202c which communicates with inside the microscope section 201 as shown in FIG. 4. The small hole 202c is connected to a tube 209 which is connected to the feeding pump and the feeding tank though not shown in FIG. 4.

As shown in FIG. 5, the nozzle 206 has a protruding portion 206a which has such a shape that it is engaged with the depressed portion 202b of the sealing portion 202a, and is provided with a small hole 206b which runs from the protruding portion 206a to the bottom surface near the nozzle tip. Further, an O ring 210 is inserted into a groove 206c provided in a cylindrical portion of the protruding portion 206a. Further, the nozzle 206 has a flange 206d slightly larger than the protruding portion 206a, and the flange 206d serves as a contact surface to the sealing portion 202a of the nozzle 206. The nozzle 206 is fixed to the sealing portion 202a by the elasticity of the O ring 210. Therefore, when the controller of the microscope apparatus commits a processing error, or when the operator exerts external force on the microscope apparatus, e.g., at cleaning, the nozzle can be easily removed so that the damage to the microscope apparatus and contamination inside the microscope apparatus can be prevented.

A control flow will be described. First, the necessity of the liquid feed is determined. When the liquid feed is necessary, the focusing unit 211 is first lowered for the prevention of interference between the tray 205 and the immersion objective lens 204. Thereafter, two operations are performed in parallel. One is an operation of rotational movement of the rotary stage 203 at the exchange of the sample container 208 or the change in the observation position; another is the liquid feed operation. In the rotational movement operation, the rotary stage 203 is rotated after the liquid feed operation so that the next observation point is located on the optical axis X of the immersion objective 204. Further, in the liquid feed operation, the nozzle 206 is arranged near and above the top lens of the immersion objective lens 204 by the linearly moving stage 202. Then the liquid is supplied and thereafter the nozzle 206 is returned back to a substantially original position by the linearly moving stage 202. At the return of the nozzle 206, the nozzle 206 is positioned so that the next observation point is located on the optical axis X of the immersion objective lens 204. When the two operations are finished, the focusing unit 211 is raised to the focusing position of the immersion objective lens 204. After the latency for the correction of temperature difference passes, the observation starts.

In the above-described control, the liquid feed operation starts after the immersion objective lens 204 is lowered by the focusing unit 211, and the tray 205 is moved by the linear stage 202 and the rotary stage 203. Therefore, the tray 205 is not interfered by the immersion objective lens 204. Still further, since the liquid feed operation and the movement to the next observation point are performed in parallel, the latency can be shortened.

In the above-described control, when the shape of the tray 205 is considered and the movement of the focusing unit 211 is made faster than the movement of the linear stage 202, the interference between the tray 205 and the immersion objective lens 204 can be prevented and the latency in the control system can be shortened.

In the present embodiment, the enlargement of the moving range of the linear stage and the addition of nozzle to the sealing portion of the linear stage make the liquid feed possible. Hence, an additional driving unit is not necessary, whereby the minimum liquid feed can be realized with a fewer number of parts than the parts added in the first embodiment.

Figure 6:
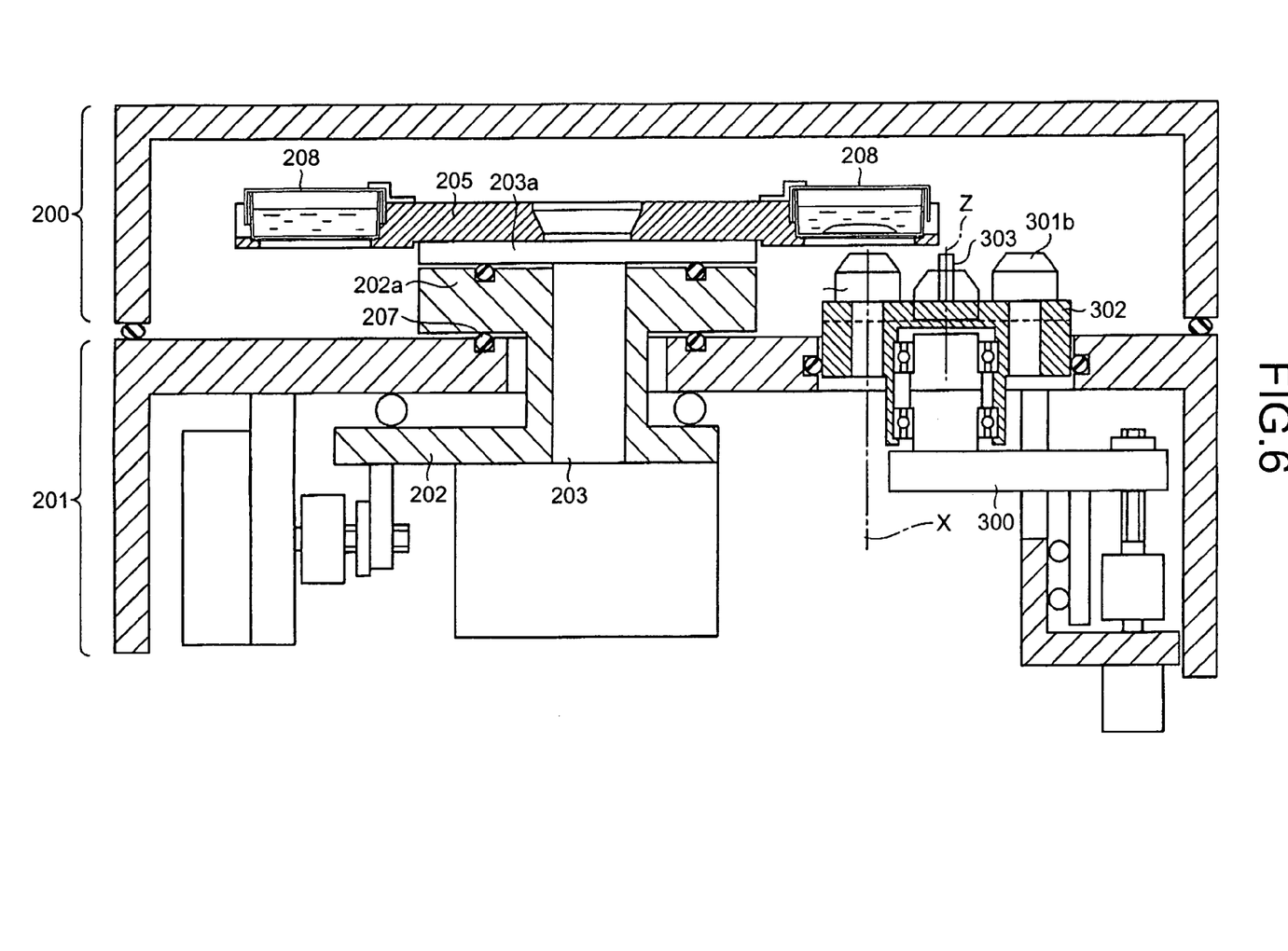
FIG. 6 shows main parts of a microscope apparatus according to a third embodiment of the present invention.
Figure 7:
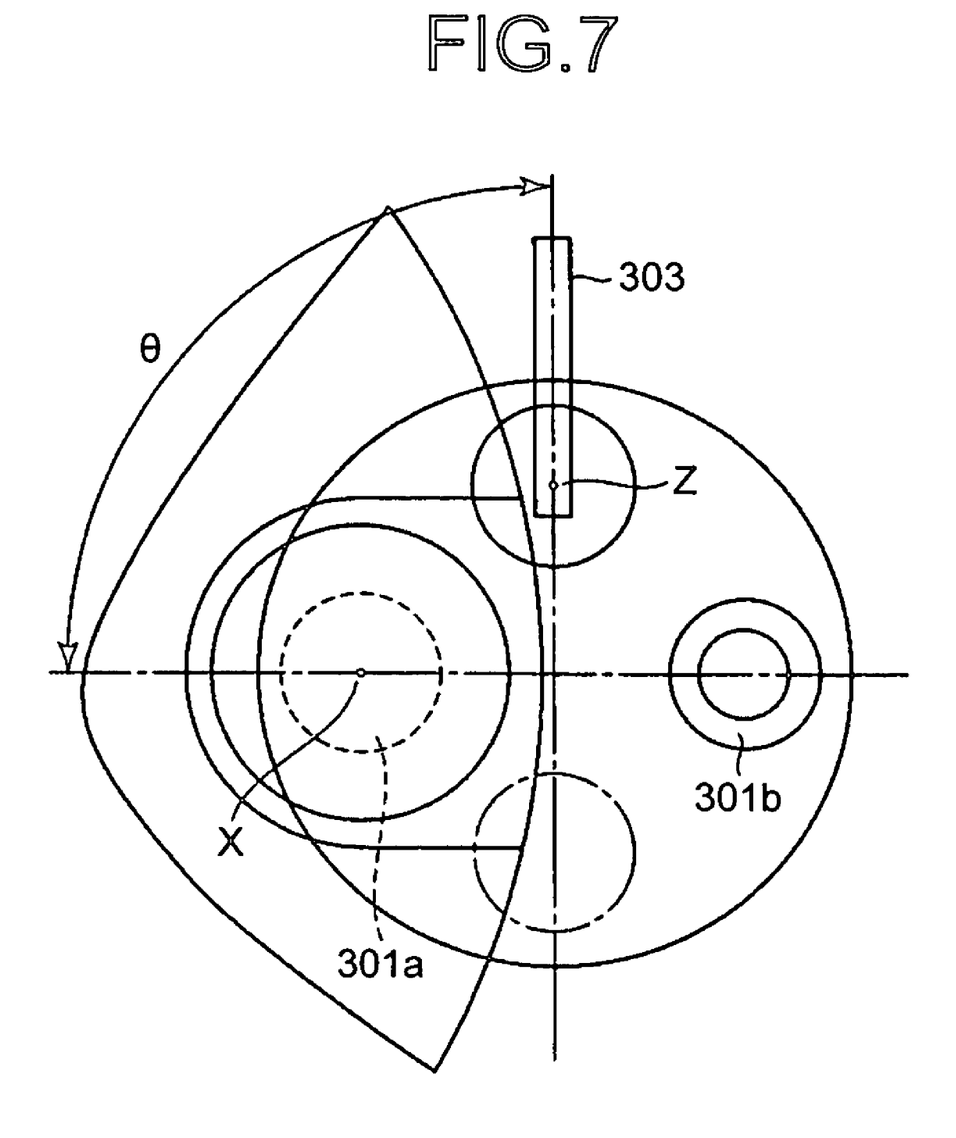
FIG. 7 schematically shows an objective lens of FIG. 6 and a surrounding portion thereof as viewed from above.

FIG. 6 shows a microscope apparatus according to a third embodiment, in particular a portion related with the liquid feed and is different from the parts in the first embodiment. Those not shown in FIG. 6 are the same as those in the first embodiment. The microscope apparatus of the present embodiment is similar to the microscope apparatus according to the second embodiment in many points, and in FIG. 6, the similar parts to the parts in the microscope apparatus according to the second embodiment are designated by the same reference characters. FIG. 7 shows the objective lens in FIG. 6 and the surrounding portion thereof viewed from above.

As shown in FIG. 6, a focusing unit 300 has a rotating-type revolver 302 which serves to switch among plural objective lenses. Two immersion objective lenses 301a and 301b can be attached to the revolver 302, which moves the immersion objective lenses 301a and 301b by rotation. The revolver 302 is designed so as to be able to position the immersion objective lens at intervals of 90 degrees. In a plane perpendicular to the optical axis X in the optical system of the microscope section 201 in which the objective lens is arranged for observation in FIG. 7, the tip of the nozzle 303 is arranged on an axis Z which is parallel to the optical axis X and passing through a point 90 degrees off from the optical axis X and which is on the circle around the center of rotation of the revolver 302 and passing through the optical axis X.

Though two objective lenses can be attached to the revolver 302 in the present embodiment, objective lenses of a number "n" may be attached to the revolver 302. In this case, the revolver 302 is designed so as to be able to position the objective lenses at intervals of θ degrees (here, θ=360÷2n). The nozzle 303 is arranged on the circle around the center of rotation of the revolver 302 and passing through the optical axis X. The arranged position of the nozzle 303 is θ (here, θ=360÷2n) degrees off from the optical axis X.

When one of the immersion objective lenses 301a and 301b is arranged on the optical axis X for observation, the other is not placed on the axis Z. The immersion objective lens located on the optical axis X is raised at the time of observation, so that the working distance (WD) between the immersion objective lens and the sample container 208 is approximately 0.1 mm. Further, when one of the immersion objective lenses 301a and 301b is placed on the axis Z for the liquid feed, the other is not placed on the optical axis X, and hence, it is not necessary to raise the focusing unit 300. Therefore, one of the top lenses of the immersion objective lenses 301a and 301b can be placed near and below the nozzle 303, which can then supply the liquid to the immersion objective lens from above.

The control flow will be described. First, the necessity of the liquid feed is decided. When the liquid feed is necessary, the focusing unit 300 is lowered for the prevention of the interference between the tray 205 and the immersion objective lens 301a. Thereafter, two operations are performed in parallel. One is the movement of the rotary stage 203 and the linear stage 202 at the exchange of the sample container 208 and the changes in observation point, and the other is the liquid feed operation. In the liquid feed operation, the immersion objective lens 301a is placed on the axis Z by the rotation of the revolver 302. Then, the top lens of the immersion objective lens 301a is placed near and below the nozzle 303. Sequentially, the liquid is supplied, and the immersion objective lens 301a is put back on the optical axis X by the rotation of the revolver 302. Thereafter, the focusing unit 300 is raised to the observation position. After the elapse of the latency for the temperature difference correction, the observation begins.

In the present embodiment, the immersion objective lens is placed below the fixed nozzle 303 by the revolver 302 which serves as a switching unit between the immersion objective lenses 301a and 301b. Thus, the liquid feed of minimum amount can be realized in a still simpler configuration than the configuration of the second embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope apparatus comprising:
   an immersion objective lens that condenses light from a sample through a liquid;
   a nozzle that supplies the liquid to an upper surface of the immersion objective lens; and
   a liquid feeding mechanism which is provided at a lens moving mechanism that moves the immersion objective lens or a sample moving mechanism that holds and moves the sample, and which moves the nozzle and the immersion objective lens relative to each other to arrange the nozzle near and above the immersion objective lens to supply the liquid from above the immersion objective lens.

2. The microscope apparatus according to claim 1, wherein:
   the lens moving mechanism comprises a focusing mechanism that moves the immersion objective lens in a vertical direction to focus the immersion objective lens on the sample, and
   the liquid feeding mechanism includes a nozzle moving mechanism that moves the nozzle in conjunction with a vertical movement of the immersion objective lens, so that the nozzle is arranged above the immersion objective lens when the immersion objective lens is at a lower position with respect to the nozzle, and the nozzle is retreated from above the immersion objective lens when the immersion objective lens is at an upper position with respect to the nozzle.

3. The microscope apparatus according to claim 2, wherein the nozzle moving mechanism includes:
   a cam member that has a cam surface inclined in a vertical direction, is arranged at a vertically moving portion of the lens moving mechanism, and moves vertically together with the immersion objective lens,
   a rotation axis that holds the nozzle and rotates the nozzle so that the nozzle is perpendicular to an optical axis of the immersion objective lens,
   a rotating pin that is fixed to the rotation axis in contact with the cam surface, is moved along the cam surface along with a downward movement of the immersion objective lens, and rotates the rotation axis in a direction that the nozzle is arranged on the immersion objective lens,
   an elastic member that has one end connected to the rotating pin to exert elastic force onto the rotating pin, and rotates the rotation axis in a direction of retraction of the nozzle from the immersion objective lens along an upward movement of the immersion objective lens, and
   a restricting member that restricts the rotation of the rotating pin by the elastic force at a predetermined position.

4. The microscope apparatus according to claim 1, wherein:
   the sample moving mechanism comprises a linear stage that moves the sample linearly in a direction perpendicular to an optical axis of the immersion objective lens,
   the nozzle is arranged on the linear stage so as to face the immersion objective lens, and
   the liquid feeding mechanism moves the nozzle by the linear stage, so that the nozzle is arranged above the immersion objective lens when the immersion objective lens is at a lower position with respect to the nozzle, and the nozzle is retreated from above the immersion objective lens when the immersion objective lens is at an upper position with respect to the nozzle.

5. The microscope apparatus according to claim 1, comprising a plurality of immersion objective lenses, wherein:
   the lens moving mechanism comprises an objective switching mechanism that holds the immersion objective lenses and moves the immersion objective lenses to selectively place one of the immersion objective lenses under the sample,
   the nozzle is arranged on a moving path of the selected immersion objective lens and is arranged near and above the selected immersion objective lens, and
   the liquid feeding mechanism moves the selected immersion objective lens by the objective switching mechanism, so that the nozzle is arranged above the selected immersion objective lens when the selected immersion objective lens is at a lower position with respect to the nozzle, and the nozzle is retreated from above the selected immersion objective lens when the selected immersion objective lens is at an upper position with respect to the nozzle.

6. The microscope apparatus according to claim 1, further comprising:
   a controller that controls operation of the liquid feeding mechanism to feed the liquid to the immersion objective lens and operation of the sample moving mechanism to change an observation point of the sample, in parallel.

7. The microscope apparatus according to claim 1, further comprising a temperature adjuster that maintains at a same level temperatures of the nozzle, the immersion objective lens, and a space in which the nozzle and the immersion objective lens are placed, wherein the nozzle is connected to a circulating tube that circulates the liquid and that is arranged in the space in which the nozzle and the immersion objective lens are placed, and the nozzle supplies the temperature maintained liquid through the circulating tube to the upper surface of the immersion objective lens.

8. A microscope apparatus comprising:

a plurality of objective lenses, at least one of the plurality of objective lenses being an immersion objective lens that condenses light from a sample through a liquid;

an objective switching mechanism that holds the plurality of objective lenses and moves the plurality of objective lenses to selectively place one of the plurality of the objective lenses under the sample;

a nozzle that is arranged on a moving path of the plurality of the objective lenses and arranged near and above the plurality of the objective lenses, the nozzle supplying the liquid to an upper surface of the immersion objective lens; and a liquid feeding mechanism that moves the plurality of objective lenses by the objective switching mechanism so that the liquid is supplied from above the selected immersion objective lens when the selected immersion objective lens is below the nozzle.

9. The microscope apparatus according to claim 8, further comprising a temperature adjuster that maintains at a same level temperatures of the nozzle, the selected immersion objective lens, and a space in which the nozzle and the selected immersion objective lens are placed, and wherein the nozzle is connected to a circulating tube that circulates the liquid and that is arranged in the space in which the nozzle and the selected immersion objective lens are placed, and the nozzle supplies the temperature maintained liquid through the circulating tube to the upper surface of the selected immersion objective lens.

* * * * *